(12) United States Patent
Ohyama

(10) Patent No.: US 11,092,804 B2
(45) Date of Patent: Aug. 17, 2021

(54) VIRTUAL IMAGE DISPLAY DEVICE

(71) Applicant: JVCKENWOOD Corporation, Yokohama (JP)

(72) Inventor: Minoru Ohyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 154 days.

(21) Appl. No.: 16/544,985

(22) Filed: Aug. 20, 2019

(65) Prior Publication Data

US 2019/0369395 A1 Dec. 5, 2019

Related U.S. Application Data

(63) Continuation of application No. PCT/JP2018/036775, filed on Oct. 2, 2018.

(30) Foreign Application Priority Data

Nov. 14, 2017 (JP) .............................. JP2017-218832

(51) Int. Cl.
*G02B 27/01* (2006.01)
*B60K 35/00* (2006.01)
*G03B 21/28* (2006.01)

(52) U.S. Cl.
CPC .......... *G02B 27/0101* (2013.01); *B60K 35/00* (2013.01); *G03B 21/28* (2013.01); *B60K 2370/1529* (2019.05); *B60K 2370/31* (2019.05); *B60K 2370/334* (2019.05)

(58) Field of Classification Search
CPC .......... G02B 27/0101; G02B 2027/011; G02B 2027/012; G02B 2027/0121; G02B 2027/0129; G02B 2027/0145; G02B 27/0172; G03B 21/28; B60K 35/00
See application file for complete search history.

(56) References Cited

FOREIGN PATENT DOCUMENTS

| CN | 104597601 A | 5/2015 |
|---|---|---|
| CN | 106681004 A | 5/2017 |
| CN | 106740116 A | 5/2017 |
| CN | 106932898 A | 7/2017 |

(Continued)

OTHER PUBLICATIONS

Sakai, WO2015/064497 A1; 2015; Machine Translation into English (Year: 2015).*

*Primary Examiner* — Ryan D Howard
(74) *Attorney, Agent, or Firm* — Brundidge & Stanger, P.C.

(57) ABSTRACT

A virtual image display device includes: a display unit that generates an image display light; and a projection optical system including a main concave mirror that reflects the image display light toward the virtual image presentation plate and an auxiliary concave mirror that reflects the image display light toward the main concave mirror. Defining a reference plane along both a direction of incidence and a direction of output of the image display light on the virtual image presentation plate, the main concave mirror is provided in an orientation that causes the image display light to be incident on the main concave mirror in a direction along the reference plane, and the auxiliary concave mirror is provided in an orientation that causes the image display light to be incident on the auxiliary concave mirror in a direction intersecting the reference plane.

14 Claims, 6 Drawing Sheets

(56) References Cited

FOREIGN PATENT DOCUMENTS

| EP | 0420228 A2 | 4/1991 |
| JP | S62225429 A | 10/1987 |
| JP | H06130318 A | 5/1994 |
| JP | 2015087594 A | 5/2015 |
| WO | 2015064497 A1 | 5/2015 |
| WO | 2017187514 A1 | 11/2017 |

* cited by examiner

VIRTUAL IMAGE DISPLAY DEVICE

CROSS REFERENCE TO RELATED APPLICATION

Priority is claimed to Japanese Patent Application No. 2017-218832, filed on Nov. 14, 2017, the entire content of which is incorporated herein by reference.

BACKGROUND OF THE INVENTION

1. Field of the Invention

The present invention relates to a virtual image display device.

2. Description of the Related Art

Recently, head-up displays are available for use as display devices for vehicles. A head-up display projects an image display light toward, for example, a windshield of a vehicle, superimposes a virtual image based on the image display light on the scenery outside the vehicle, and displays the resultant image. A windshield has two interfaces inside and outside the vehicle. The image display lights reflected at the respective interfaces and visually perceived may be superimposed with a shift and viewed as double images. To inhibit double images from being produced, there is proposed a mathematical expression for defining a viewing distance to contain the amount of shift between double images within the resolution of the human eyes and obtaining an optical arrangement that realizes the viewing distance.

The technology described above requires a large viewing distance to the position of presentation of a virtual image ahead of the user in order to reduce double images. It is preferred to reduce the occurrence of double images suitably, regardless of the viewing distance to a virtual image.

SUMMARY OF THE INVENTION

The embodiments address the above-described issue, and a general purpose thereof is to provide a technology for improving the visibility of a virtual image presented.

An embodiment of the present invention relates to a virtual image display device for presenting a virtual image to a user via a virtual image presentation plate. The virtual image display device includes: a display unit that generates an image display light by modulating an illumination light; and a projection optical system that projects the image display light toward the virtual image presentation plate. The projection optical system includes a main concave mirror that reflects the image display light toward the virtual image presentation plate and an auxiliary concave mirror that reflects the image display light toward the main concave mirror. Defining a plane along both a direction of incidence and a direction of output of the image display light on the virtual image presentation plate as a reference plane, the main concave mirror is provided in an orientation that causes the image display light to be incident on the main concave mirror in a direction along the reference plane, and the auxiliary concave mirror is provided in an orientation that causes the image display light to be incident on the auxiliary concave mirror in a direction intersecting the reference plane.

Another embodiment of the present invention also relates to a virtual image display device for presenting a virtual image to a user via a virtual image presentation plate. The virtual image display includes: a display unit that generates an image display light by modulating an illumination light; and a projection optical system that projects the image display light toward the virtual image presentation plate. The image display light includes a first display light reflected by a first principal surface of the virtual image presentation plate and traveling toward the user and a second display light refracted by the first principal surface, reflected by a second principal surface of the virtual image presentation plate opposite to the first principal surface, refracted by the first principal surface, and traveling toward the user. The projection optical system includes a first reflection area shaped in a concave surface that reflects the first display light toward the virtual image presentation plate and a second reflection area shaped in a concave surface that reflects the second display light toward the virtual image presentation plate. In a composite optical system formed by the virtual image presentation plate and the projection optical system, the projection optical system is configured such that a second focal distance of the composite optical system on a second light path on which the second display light travels is shorter than a first focal distance of the composite optical system on a first light path on which the first display light travels, and the display unit is positioned between a first focal point and a second focal point of the composite optical system.

Optional combinations of the aforementioned constituting elements, and mutual substitution of constituting elements and implementations between methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially the identical function and configuration are represented by the same reference symbols, and the description is not duplicated. Elements not directly relevant to the invention are omitted from the illustration.

Figure 1:
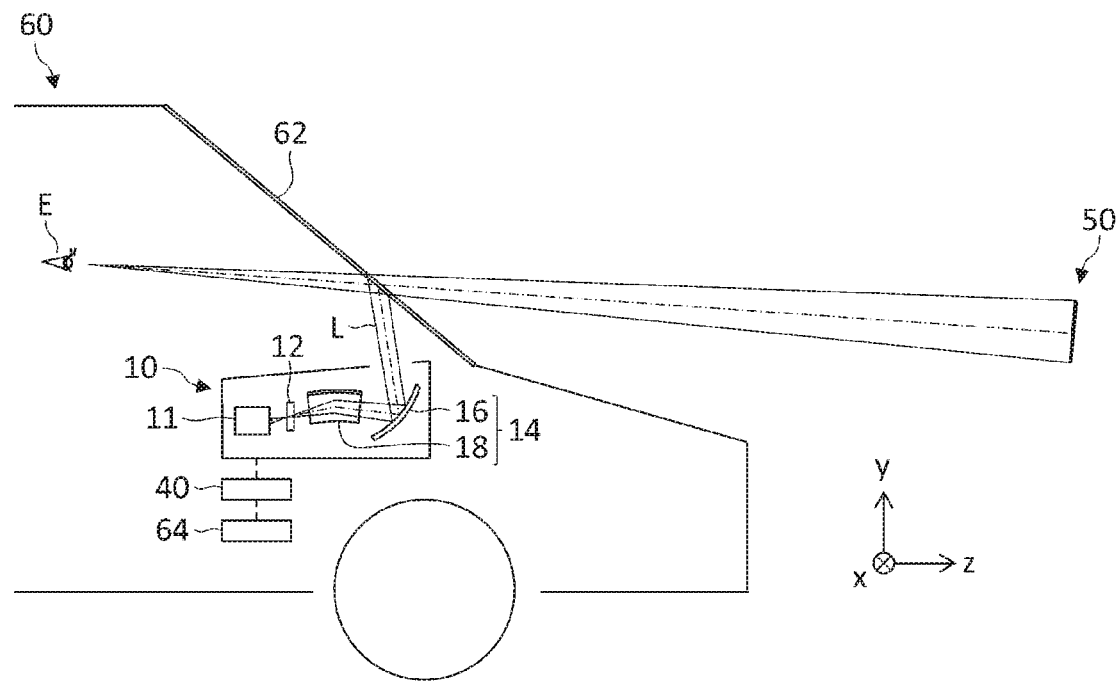
FIG. 1 schematically shows a configuration of a virtual image display device according to the embodiment.

FIG. 1 schematically shows a configuration of a virtual image display device 10 according to the embodiment.

In this embodiment, the virtual image display device 10 is installed in a dashboard of a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting an image display light toward a windshield 62, which is a virtual image presentation plate. The user E (e.g., the driver) can see the virtual image 50 superimposed on the actual scenery via the windshield 62. Therefore, the driver E can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up/down direction) is defined as the y direction, and the transversal direction of the vehicle 60 is defined as the x direction.

The virtual image display device 10 includes an illumination unit 11, a display unit 12, a projection optical system 14, and a control unit 40. The illumination unit 11 is a light source for generating a display light and generates an illumination light for illuminating the display unit 12. The illumination unit 11 includes a light emitting device such as a light emitting diode (LED) and a laser diode (LD), and an optical device for adjusting the light intensity distribution and angle distribution of the light output from the light emitting device. The illumination unit 11 provides the display unit 12 with a substantially uniform white light. The configuration of the illumination unit 11 is not limited to any particular type. For example, a light emitting device such as a light tunnel, a Fresnel lens, and a light diffusion plate may be used to condition the output light from the light emitting device.

The display unit 12 modulates an illumination light from the illumination unit 11 to generate a display light and forms an intermediate image corresponding to the display content of the virtual image 50. The display unit 12 includes an image display device of transmission type for generating a display light. For example, the display unit 12 includes a display device such as a liquid crystal panel of transmission type. The image display device receives an image signal transmitted from the control unit 40 and generates an image display light for the display content corresponding to the image signal. The display unit 12 may further include an optical device for conditioning the orientation and light distribution angle of the image display light. Further, the display unit 12 may be configured by combining an element other than a liquid crystal panel of transmission type and a screen of transmission type such as a microlens array sheet and a light diffusion sheet. The element is exemplified by a projection unit such as a digital micromirror device (DMD), a liquid crystal on silicon (LOCS) laser scanning module (LSM), and a micro electro mechanical systems (MEMS) LSM.

The projection optical system 14 projects the image display light generated by the display unit 12 toward the windshield 62. The projection optical system 14 includes a main concave mirror 16 and an auxiliary concave mirror 18. The main concave mirror 16 reflects the image display light from the display unit 12 toward the windshield 62. The auxiliary concave mirror 18 is provided between the display unit 12 and the main concave mirror 16 and conditions the direction of the image display light traveling from the display unit 12 toward the main concave mirror 16.

The projection optical system 14 may further include an additional optical device (not shown). For example, a planar mirror for folding the light path from the illumination unit 11 to the main concave mirror 16 may be provided. The additional planar mirror may be provided between the illumination unit 11 and the display unit 12 or provided between the display unit 12 and the auxiliary concave mirror 18. Two or more planar mirrors may be provided in the projection optical system 14.

The control unit 40 operates an image for display and causes the illumination unit 11 and the display unit 12 to operate to present the virtual image 50 corresponding to the image for display. The control unit 40 is connected to an external device 64 and generates the image for display based on the information from the external device 64.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, and tablet. The external device 64 transmits, to the control unit 40, image data necessary to display the virtual image 50, information indicating the content and type of the image data, and information related to the vehicle 60 such as the speed and current position of the vehicle 60.

In this embodiment, the image display lights reflected at the two interfaces of the windshield 62 inside and outside the vehicle and visually perceived are prevented from being presented with a shift and viewed as double images, by combining the two concave mirrors 16 and 18 and providing the display unit 12 at a predetermined position. Before describing the optical arrangement according to the embodiment in detail, a description will be given of the occurrence of double images with reference to a comparative example.

Figure 2:
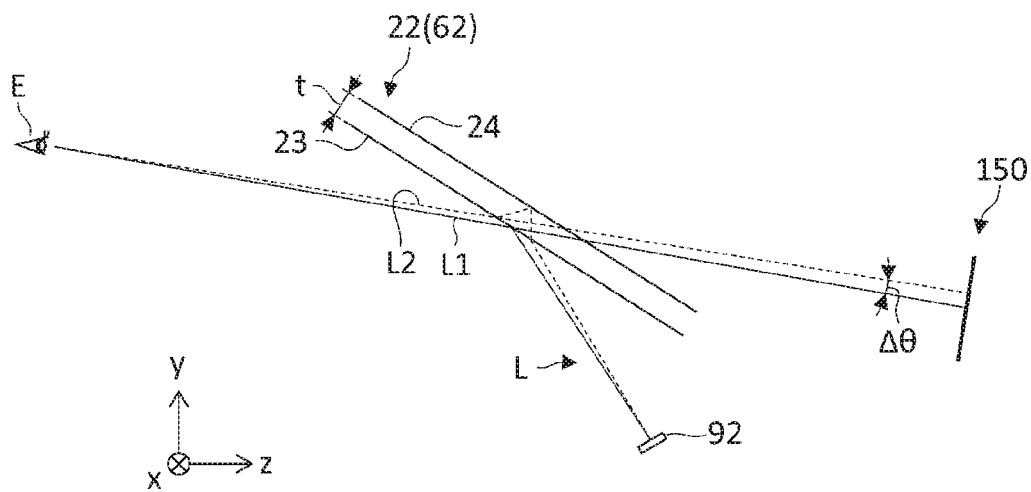
FIG. 2 schematically shows the occurrence of double images induced by the virtual image presentation plate.

FIG. 2 schematically shows the occurrence of double images induced by the virtual image presentation plate 22. In FIG. 2, an optical device such as a concave mirror provided between the virtual image presentation plate 22 and a display unit 92 is omitted for simplify the description. The virtual image presentation plate 22 has a predetermined thickness t and has a first principal surface 23 and a second principal surface 24. The first principal surface 23 corresponds to the interface of the windshield 62 inside the vehicle, and the second principal surface 24 corresponds to the interface of the windshield 62 outside the vehicle.

The image display light arriving at the user E from an arbitrary point E of the display unit 92 mainly travels on two light paths L1, L2. The first light path L1 is a light path in which the light is reflected by the first principal surface 23 and travels toward the user E. The second light path L2 is a light path in which the light is refracted by the first principal surface 23, reflected by the second principal surface 24, and then re-refracted by the first principal surface 23 and travels toward the user E. If there is an angular difference Δθ between the first light path L1 and the second light path L2 leading toward the user E, the image display lights traveling on the two light paths L1, L2 are visually perceived as being shifted from each other according to the angular difference Δθ, producing double images in a virtual image 150. While it is possible to postulate a light path in which the light is reflected multiple times between the first principal surface 23 and the second principal surface 24 and travels toward the user E, the component of the image display light reflected multiple times and traveling toward the user E is small and can be neglected in a normal mode of usage.

Figure 3:
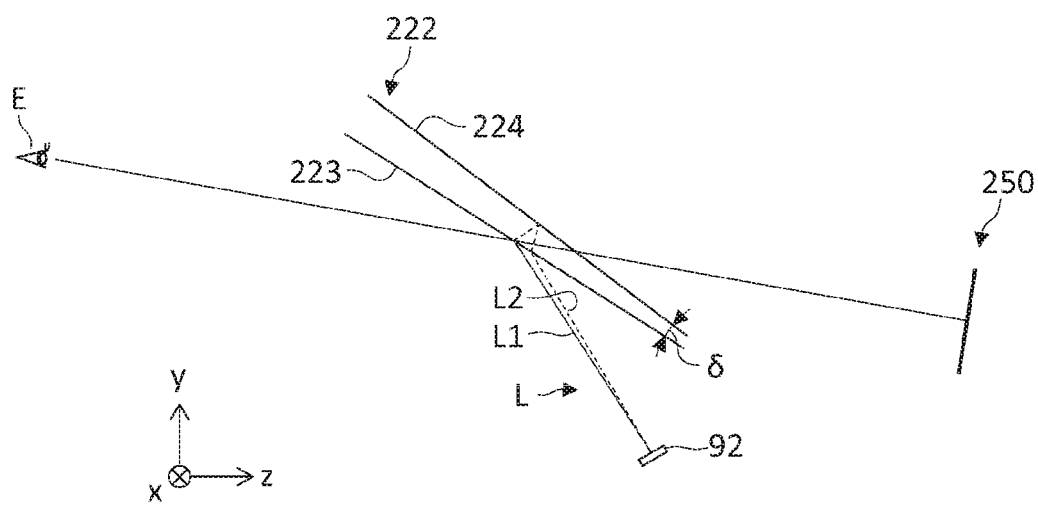
FIG. 3 schematically shows inhibition of double images effected by a wedge glass.

FIG. 3 schematically shows inhibition of double images effected by a wedge glass. The virtual image presentation plate 222 shown in FIG. 3 is a so-called "wedge glass" and is configured such that the thickness of the virtual image presentation plate 222 varies depending on the location. This results in a first principal surface 223 and a second principal surface 224 of the virtual image presentation plate 222 having mutually different angles of inclination relative to a virtual image display device 110, and an angular difference δ is provided between the surfaces. By using a wedge glass in which the angular difference δ is provided between the two principal surfaces 223, 224, the angular difference Δθ between the first light path L1 and the second light path L2 is corrected, and a virtual image 250 in which double images are reduced is presented.

However, a "wedge glass" like this need be formed by controlling the angular difference δ with high precision and so is more expensive than an ordinary glass having a uniform thickness t. Further, forming the windshield 62 of the vehicle 60 by using a wedge glass not only requires a dedicated wedge glass adapted to the shape of the vehicle 60 but also requires replacing the entirety of the windshield 62 so that a heavy cost will be incurred. It is therefore preferred to reduce the occurrence of double images without using a special wedge glass.

Figure 4:
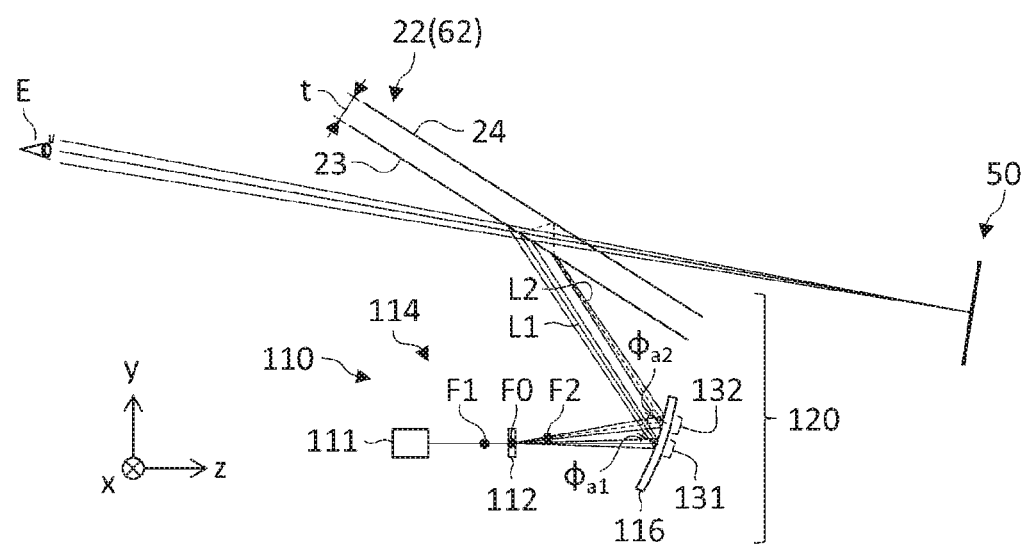
FIG. 4 shows an optical arrangement in the virtual image display device according to the embodiment in detail.

FIG. 4 shows an optical arrangement in the virtual image display device 110 according to the embodiment in detail. The virtual image display device 110 according to the comparative example includes an illumination unit 111, a display unit 112, a projection optical system 114, and the projection optical system 114 is comprised of a single concave mirror 116. According to the comparative example, the occurrence of double images is inhibited by arranging the display unit 112 and the concave mirror 116 properly.

In the configuration of FIG. 4, the projection optical system 114 is configured such that the first light path L1 and the second light path L2 on which the light travels from the virtual image presentation plate 22 toward the user E coincide. As a result, the first light path L1 and the second light path L2 will be parallel or substantially parallel in a segment between the virtual image presentation plate 22 and the concave mirror 116, and the second light path L2 will be located farther than the first light path L1 as viewed from the user E. Further, the image display light traveling on the first light path L1 and the image display light traveling on the second light path L2 are reflected in different areas 131 and 132 on the concave mirror 116. More specifically, the second reflection area 132 in which the second display light traveling on the second light path L2 is reflected is located above (closer to the virtual image presentation plate 22) than the first reflection area 131 in which the first display light traveling on the first light path L1 is reflected. This optical arrangement causes the angle $\varphi_{a2}$ of incidence and reflection of the second display light in the second reflection area 132 to be larger than the angle $\varphi_{a1}$ of incidence and reflection of the first display light in the first reflection area 131.

Generally, when parallel light beams are caused to be diagonally incident on a concave mirror, the distance to the position of convergence of light (i.e., the focal distance) could change in accordance with the angle of incidence. Denoting the focal distance of the concave mirror by f and the angle of incidence of light on the concave mirror by φ, the focal distance of diagonally incident light is given by f·cos φ. The larger the angle φ of incidence and reflection, the smaller the focal distance f·cos φ. Thus, the angle $\varphi_{a1}$ of incidence and reflection in the first reflection area 131 is relatively small in the configuration of FIG. 4 so that the focal distance will be relatively long. Meanwhile, the angle $\varphi_{a2}$ of incidence and reflection in the second reflection area 132 is relatively large so that the focal distance will be relatively short.

Figure 5:
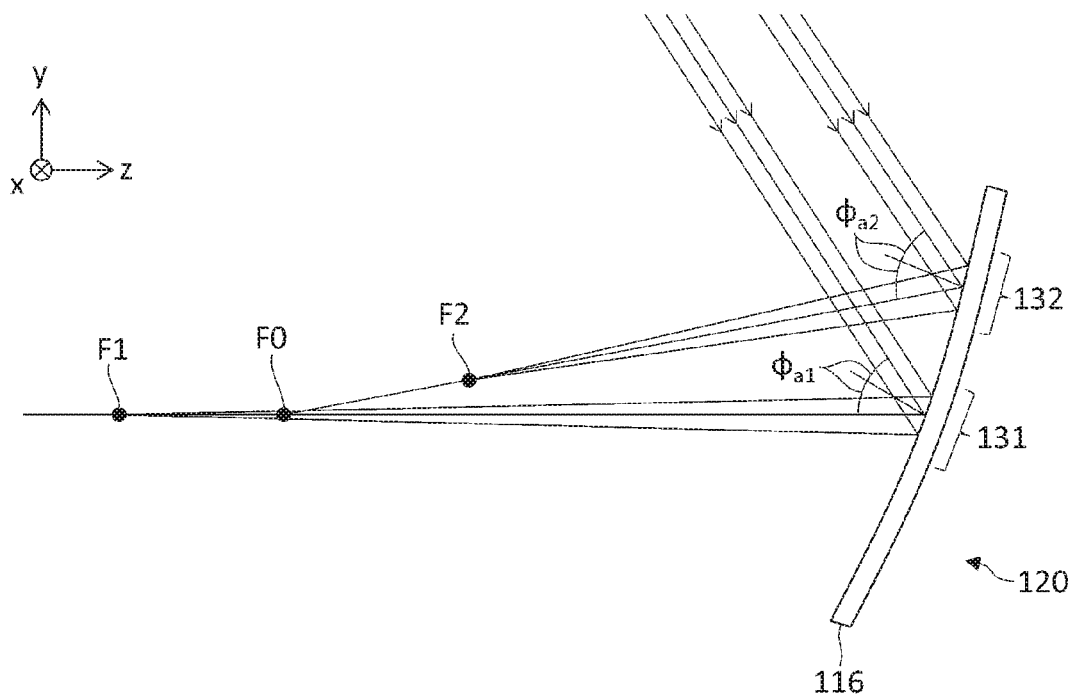
FIG. 5 schematically shows the focal position of a beam diagonally incident on the concave mirror.

FIG. 5 schematically shows focal positions of beams diagonally incident on the concave mirror 116 and shows a case where parallel light beams are caused to be incident on the concave mirror 116. As illustrated, the position of convergence (the first focal point) F1 of the parallel beams reflected in the first reflection area 131 is farther than the position of convergence (the second focal point) F2 of the parallel beams reflected in the second reflection area 132. Further, the point of intersection (also referred to as the reference point) F0 between the beam reflected in the first reflection area 131 and the beam reflected in the second reflection area 132 is located between the first focal point F1 and the second focal point F2.

In the comparative example of FIG. 4, the occurrence of double images is inhibited by providing the display unit 112 at the reference point F0 between the first focal point F1 and the second focal point F2 or in the neighborhood of the reference point F0. Since the display unit 112 is provided nearer the user E along the light path (nearer the concave mirror 116) than the focal point on the first light path L1 (the first focal point F1), the light beam of the first display light traveling on the first light path L1 will be a convergent light that converges toward the user E. As a result, the first display light presents the virtual image 150 that is visually perceived at a finite distance as viewed from the user E. Meanwhile, since the display unit 112 is provided farther from the user E along the light path (farther from the main concave mirror) than the focal point on the second light path L2 (the second focal point F2), the light beam of the second display light traveling on the second light path L2 will be a divergent light that diverges toward the user E. As a result, the second display light does not form an image as viewed from the user E and presents a blurred light. Thus, according to the comparative example, the virtual image 150 is presented at a finite distance based on the first display light reflected by the first principal surface 23 of the virtual image presentation plate 22, and, at the same time, imaging of the second display light reflected by the second principal surface 24 is prevented. In this way, the occurrence of double images is inhibited, and, at the same time, the virtual image 150 is presented at a finite distance to make it easy for the user to see the image.

In the comparative example of FIG. 4, however, the image display light L is caused to be diagonally incident on the single concave mirror 16 so that astigmatism could be produced. "Astigmatism" is defined as non-coincidence of the focal point of a composite optical system 120 on the meridional plane and the focal point on the sagittal plane. Astigmatism produces a shift between the imaging position of the virtual image 150 in the horizontal direction (x direction) and the imaging position in the vertical direction (y direction) and results in reduction of the imaging performance. The term "meridional plane" refers to a plane that includes the light axis of the composite optical system 120 and the principal ray of the image display light L. The yz plane in FIG. 4 represents the meridional plane. Meanwhile, the term "sagittal plane" refers to a plane that includes the light axis of the composite optical system 120 and is a plane perpendicular to the meridional plane. The xz plane in FIG. 4 represents the sagittal plane.

Figure 6A:
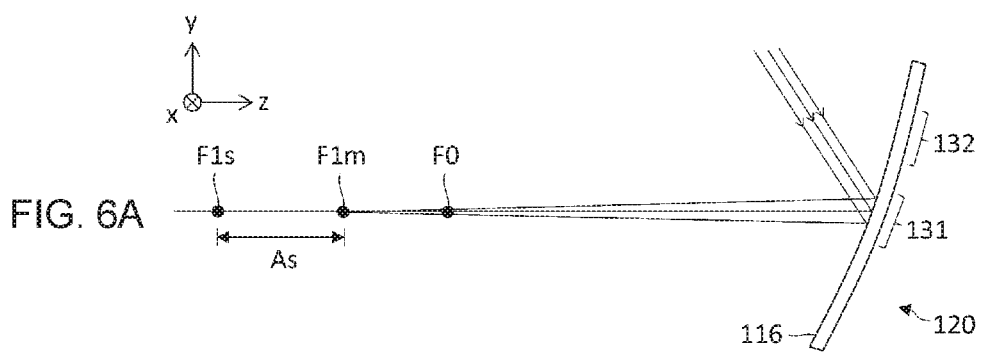
FIGS. 6A and 6B schematically show astigmatism of parallel beams diagonally incident on the concave mirror.
Figure 6B:
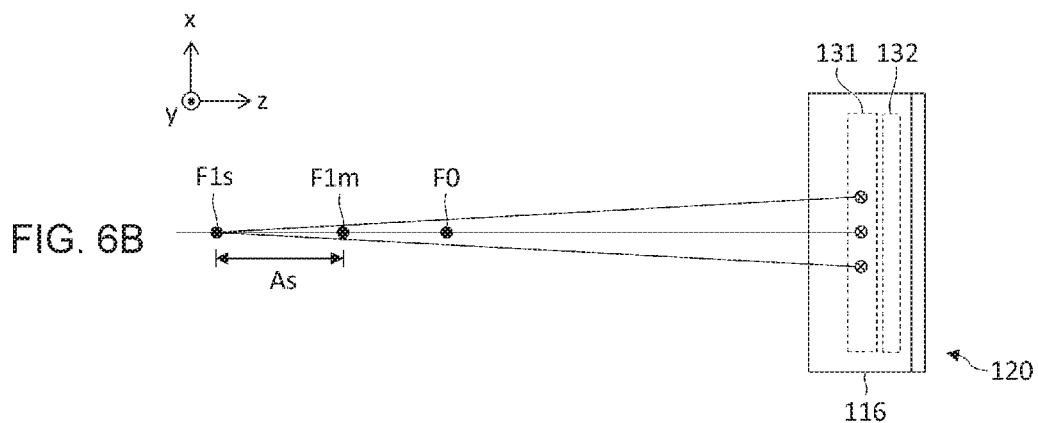

FIGS. 6A and 6B schematically show astigmatism of parallel beams incident on the concave mirror 116 and show views from different points of view. FIG. 6A corresponds to FIG. 5 described above and schematically shows light beams within the meridional plane (yz plane) of the composite optical system 120 formed by the virtual image presentation plate 22 and the concave mirror 116. FIG. 6B schematically shows light beams within the sagittal plane (xz plane) of the composite optical system 120 formed by the virtual image presentation plate 22 and the concave mirror 116. As illustrated, the points of convergence F1$m$ and F1$s$ of the parallel beams differ between the meridional plane and the sagittal plane. The focal point F1$s$ within the sagittal plane is located farther from the concave mirror 116 than the focal point F1$m$ within the meridional plane. This is because the focal distance within the meridional plane on which the light is diagonally incident will be shortened to f·cos φ, as described with reference to FIG. 5.

In order to reduce the astigmatism As defined as a shift between the focal point F1$m$ within the meridional plane and the focal point F1$s$ within the sagittal plane, the angle φ of incidence and reflection on the concave mirror 116 may be reduced. In a configuration in which the concave mirror 116 projects the image display light L onto the virtual image presentation plate 22, however, it is difficult to reduce φ the angle of incidence and reflection on the concave mirror 116 significantly. This is addressed by the embodiment by combining two concave mirrors to cause the astigmatic properties produced on the respective concave mirrors to be opposite to each other and to reduce the astigmatism in the projection optical system a whole.

Figure 7:
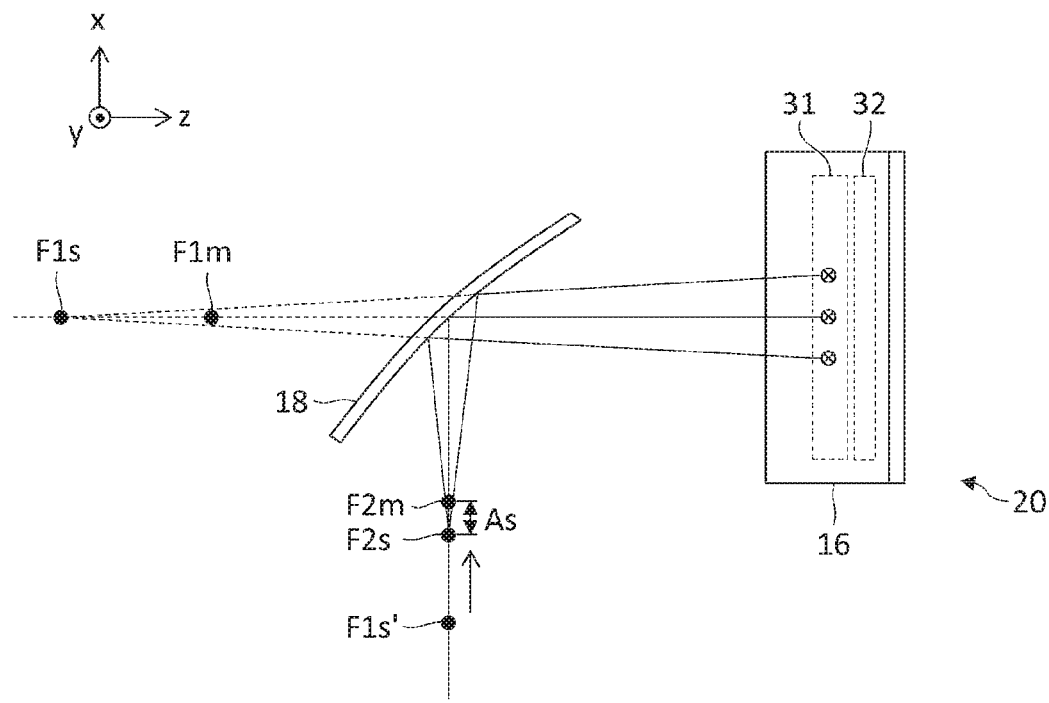
FIG. 7 schematically shows reduction of astigmatism effected by two concave mirrors.

FIG. 7 schematically shows reduction of astigmatism effected by two concave mirrors 16 and 18. In the example of FIG. 7, the two concave mirrors are arranged in a twisted configuration. Symbols F1$m$ and F1$s$ denote the focal point within the meridional plane and the focal point within the sagittal plane in the presence of the main concave mirror 16 alone, and symbols F2$m$ and F2$s$ denote the focal point within the meridional plane and the focal point within the sagittal plane in a composite optical system 20 in which the main concave mirror 16 and the auxiliary concave mirror 18 are combined. Since the two concave mirrors 16 and 18 are arranged in a twisted configuration, the xz plane as illustrated is the sagittal plane in the main concave mirror 16 and the meridional plane in the auxiliary concave mirror 18. As a result, of the focal points F2$m$ and F2$s$ of the composite optical system 20, the auxiliary concave mirror 18 functions to position the focal point F2$s$ within the xz plane at a shorter distance. In other words, the arrangement positions the focal point F2$s$ within the sagittal plane of the composite optical system 20 nearer the user along the light path than the focal point F1$s'$ within the sagittal plane that would occur when the light path is folded by using a planar mirror instead of the auxiliary concave mirror 18 and so reduces the distance to the focal point F2$m$ within the meridional plane (i.e., the astigmatism). In this way, an optical system having more excellent imaging performance than that of the comparative example described above is realized, and the virtual image 50 having a higher resolution is presented.

Figure 8A:
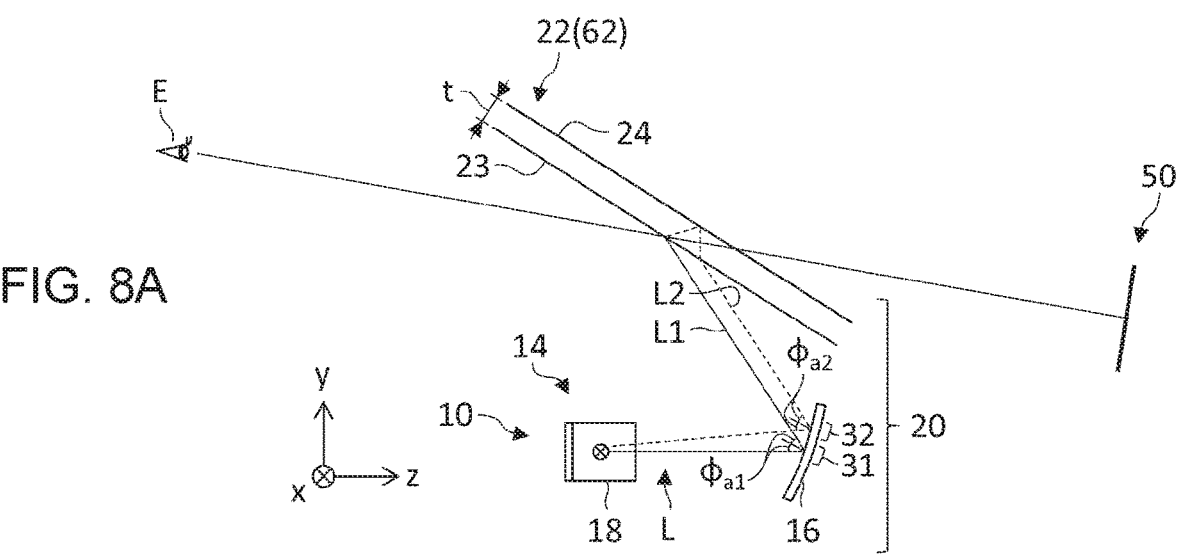
FIGS. 8A, 8B and 8C show the configuration of the virtual image display device according to the embodiment in detail.
Figure 8B:
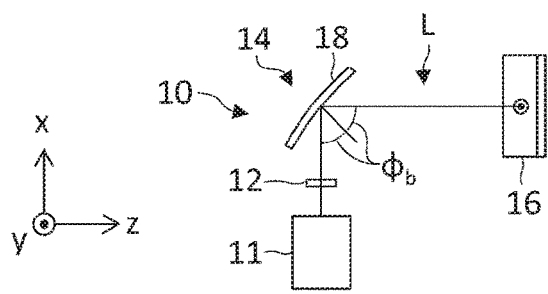
Figure 8C:
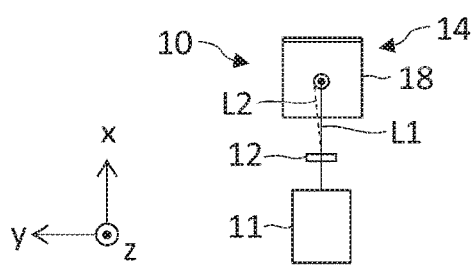

FIGS. 8A-8C show the configuration of the virtual image display device according to the embodiment in detail and show views from different points of view. FIG. 8A corresponds to FIG. 1 and shows a configuration viewed on the yz plane. FIG. 8B shows a configuration viewed on the xz plane, and FIG. 8C shows a configuration viewed on the xy plane.

As shown in FIG. 8C, the illumination unit 11, the display unit 12, and the auxiliary concave mirror 18 are arranged in the stated order in the x direction. As shown in FIG. 8B, the auxiliary concave mirror 18 is arranged to reflect, in the z direction, the image display light L incident on the auxiliary concave mirror 18 in the x direction. As shown in FIG. 8A, the main concave mirror 16 is arranged to reflect, upward and toward the virtual image presentation plate 22, the image display light L incident on the main concave mirror 16 in the z direction.

FIGS. 8A-8C depict the configuration, using, as a reference, the first light path L1 on which the first display light reflected by the first principal surface 23 of the virtual image presentation plate 22 travels. In other words, the light path indicated by the solid line in FIGS. 8A-8C represents the first light path L1. Meanwhile, the second light path L2 on which the second display light reflected by the second principal surface 24 of the virtual image presentation plate 22 is indicated by broken lines and is located slightly above the first light path L1. The first light path L1 and the second light path L2 from the display unit 12 to the main concave mirror 16 are not parallel and are oriented differently in the y direction. More specifically, the device is configured such that the first display light traveling on the first light path L1 is incident on a first reflection area 31 of the main concave mirror 16, and the second display light traveling on the second light path L2 is incident on a second reflection area 32 above the first reflection area 31. As a result, the angle $φ_{a2}$ of incidence and reflection of the second display light on the main concave mirror 16 will be larger than the angle $φ_{a1}$ of incidence and reflection of the first display light. This makes the second focal distance on the second light path L2 on which the second display light travels shorter than the first focal distance on the first light path L1 on which the first display light travels in the composite optical system 20 formed by the virtual image presentation plate 22 and the projection optical system 14.

The display unit 12 is provided at the intersection between the first light path L1 and the second light path L2 or the neighborhood thereof and is provided between the first focal point F1 and the second focal point F2 shown in FIG. 5. In the composite optical system 20 formed by the virtual image presentation plate 22 and the projection optical system 14, the display unit 12 is provided between the first focal point of the composite optical system 20 on the first light path L1 on which the first display light travels and the second focal point of the composite optical system 20 on the second light path L2 on which the second display light travels. As a result, the virtual image 50 based on the first display light is presented at a finite distance (e.g., about 2 m-7 m) as viewed from the user E, and it is difficult for the virtual image based on the second display light to form an image as viewed from the user E. In this way, the occurrence of double images is inhibited.

Since the main concave mirror 16 and the auxiliary concave mirror 18 are arranged in a twisted configuration according to the embodiment, the astigmatism in the composite optical system 20 built by combining the main concave mirror 16 and the auxiliary concave mirror 18 is reduced. For reduction of the astigmatism in the composite optical system 20, would be necessary to ensure that the astigmatism in the main concave mirror 16 and that of the auxiliary concave mirror 18 are substantially equal. This requires ensuring that the product $f_a·\cos φ_a$ of the focal distance $f_a$ of the main concave mirror 16 and the cosine cos $φ_a$ of the angle $φ_a$ of incidence and reflection of the image display light L on the main concave mirror 16 is substantially equal to the product $f_b \cdot \cos \varphi_b$ of the focal distance $f_b$ of the auxiliary concave mirror 18 and the cosine $\cos \varphi_b$ of the angle $\varphi_b$ of incidence and reflection of the image display light L on the auxiliary concave mirror 18. For example, reduction of the imaging performance caused by astigmatism is suitably prevented by designing the device such that the focal distance $f_a \cdot \cos \varphi_a$ within the meridional pane of the main concave mirror 16 is not less than 0.5 times and not more than twice the focal distance $f_b \cdot \cos \varphi_b$ within the meridional plane of the auxiliary concave mirror 18.

Since the projection optical system 14 is comprised of a concave mirror according to the embodiment, chromatism caused by an optical device of transmission type such as a lens can be prevented from being produced, and the virtual image 50 with a higher resolution is presented than in the related-art device.

The present invention has been described above with reference to the embodiment but is not limited to the embodiment. Appropriate combinations or replacements of the features of the illustrated examples are also encompassed by the present invention.

The embodiment described above shows the case of configuring the projection optical system 14 such that the meridional plane of the main concave mirror 16 and the meridional plane of the auxiliary concave mirror 18 are orthogonal to each other. In one variation, the projection optical system 14 may be configured such that the meridional planes of the main concave mirror 16 and the auxiliary concave mirror 18 are not strictly orthogonal to each other but such that their meridional planes intersect. Defining a plane along both the direction of incidence and the direction of reflection of the image display light L on the virtual image presentation plate 22 as a reference plane (e.g., the yz plane), the projection optical system 14 may be configured such that image display light L incident on the main concave mirror 16 travels in a direction along the reference plane, and the image display light L incident on the auxiliary concave mirror 18 travels in a direction intersecting the reference plane.

The embodiment described above shows the case of configuring the first reflection area 31 that reflects the first display light toward the virtual image presentation plate 22 and the second reflection area 32 that reflects the second display light toward the virtual image presentation plate 22 by using a single concave mirror 16. In one variation, the first reflection area 31 and the second reflection area 32 may be comprised of separate optical members. Further, the first reflection area 31 and the second reflection area 32 may be comprised of similar curved surfaces or comprised of curved surfaces having different shapes. In the latter case, the first reflection area 31 and the second reflection area 32 may be spherical surfaces having different radii of curvature. Alternatively, the areas may be aspheric surfaces (free-form surfaces) defined by different parameters.

The embodiment described above shows that astigmatism is reduced by combining two concave mirrors. In one variation, double images may be inhibited by using a single concave mirror as in the comparative example shown in FIG. 4.

The embodiment described above shows that the projection optical system is configured by using a concave mirror. In one variation, the projection optical system may be configured by combining an additional lens, etc.

It should be understood that the invention is not limited to the above-described embodiment but may be modified into various forms on the basis of the spirit of the invention. Additionally, the modifications are included in the scope of the invention.

What is claimed is:

1. A virtual image display device for presenting a virtual image to a user via a virtual image presentation plate, comprising:
    a display unit that generates an image display light by modulating an illumination light; and
    a projection optical system that projects the image display light toward the virtual image presentation plate, wherein
        the projection optical system includes a main concave mirror that reflects the image display light toward the virtual image presentation plate and an auxiliary concave mirror that reflects the image display light toward the main concave mirror,
        defining a plane along both a direction of incidence and a direction of output of the image display light on the virtual image presentation plate as a reference plane, the main concave mirror is provided in an orientation that causes the image display light to be incident on the main concave mirror in a direction along the reference plane, and the auxiliary concave mirror is provided in an orientation that causes the image display light to be incident on the auxiliary concave mirror in a direction along a plane orthogonal to the reference plane, and
        the projection optical system is configured such that a product $f_a \cdot \cos \varphi_a$ of a focal distance $f_a$ of the main concave mirror and a cosine $\cos \varphi_a$ of an angle $\varphi_a$ of incidence and reflection of the image display light on the main concave mirror is not less than 0.5 times and not more than twice a product $f_b \cdot \cos \varphi_b$ of a focal distance $f_b$ of the auxiliary concave mirror and a cosine $\cos \varphi_b$ of an angle $\varphi_b$ of incidence and reflection of the image display light on the auxiliary concave mirror.

2. The virtual image display device according to claim 1, wherein
    the image display light includes a first display light reflected by a first principal surface of the virtual image presentation plate and traveling toward the user and a second display light refracted by the first principal surface, reflected by a second principal surface of the virtual image presentation plate opposite to the first principal surface, refracted by the first principal surface, and traveling toward the user,
    in a composite optical system formed by the virtual image presentation plate and the projection optical system, the projection optical system is configured such that a second focal distance of the composite optical system on a second light path on which the second display light travels is shorter than a first focal distance of the composite optical system on a first light path on which the first display light travels, and
    the display unit is positioned between a first focal point and a second focal point of the composite optical system.

3. The virtual image display device according to claim 2, wherein
    the main concave mirror includes a first reflection area on which the first display light is incident and a second reflection area on which the second display light is incident and is configured such that an angle of incidence and reflection of the second display light in the second reflection area is larger than an angle of incidence and reflection of the first display light in the first reflection area.

4. The virtual image display device according to claim 1, wherein
the virtual image presentation plate is a windshield provided in a vehicle and having a uniform thickness.

5. A virtual image display device for presenting a virtual image to a user via a virtual image presentation plate, comprising:
a display unit that generates an image display light by modulating an illumination light; and
a projection optical system that projects the image display light toward the virtual image presentation plate, wherein
the projection optical system includes a main concave mirror that reflects the image display light toward the virtual image presentation plate and an auxiliary concave mirror that reflects the image display light toward the main concave mirror,
defining a plane along both a direction of incidence and a direction of output of the image display light on the virtual image presentation plate as a reference plane, the main concave mirror is provided in an orientation that causes the image display light to be incident on the main concave mirror in a direction along the reference plane, and the auxiliary concave mirror is provided in an orientation that causes the image display light to be incident on the auxiliary concave mirror in a direction along a plane orthogonal to the reference plane, and
the projection optical system is configured such that a product $f_b \cdot \cos \varphi_b$ of a focal distance $f_b$ of the auxiliary concave mirror and a cosine $\cos \varphi_b$ of an angle $\varphi_b$ of incidence and reflection of the image display light on the auxiliary concave mirror is larger than a product $f_a \cdot \cos \varphi_a$ of a focal distance $f_a$ of the main concave mirror and a cosine $\cos \varphi_a$ of an angle $\varphi_a$ of incidence and reflection of the image display light on the main concave mirror.

6. The virtual image display device according to claim 5, wherein
the image display light includes a first display light reflected by a first principal surface of the virtual image presentation plate and traveling toward the user and a second display light refracted by the first principal surface, reflected by a second principal surface of the virtual image presentation plate opposite to the first principal surface, refracted by the first principal surface, and traveling toward the user,
in a composite optical system formed by the virtual image presentation plate and the projection optical system, the projection optical system is configured such that a second focal distance of the composite optical system on a second light path on which the second display light travels is shorter than a first focal distance of the composite optical system on a first light path on which the first display light travels, and
the display unit is positioned between a first focal point and a second focal point of the composite optical system.

7. The virtual image display device according to claim 6, wherein
the main concave mirror includes a first reflection area on which the first display light is incident and a second reflection area on which the second display light is incident and is configured such that an angle of incidence and reflection of the second display light in the second reflection area is larger than an angle of incidence and reflection of the first display light in the first reflection area.

8. The virtual image display device according to claim 5, wherein
the virtual image presentation plate is a windshield provided in a vehicle and having a uniform thickness.

9. A virtual image display device for presenting a virtual image to a user via a virtual image presentation plate, comprising:
a display unit that generates an image display light by modulating an illumination light; and
a projection optical system that projects the image display light toward the virtual image presentation plate, wherein
the image display light includes a first display light reflected by a first principal surface of the virtual image presentation plate and traveling toward the user and a second display light refracted by the first principal surface, reflected by a second principal surface of the virtual image presentation plate opposite to the first principal surface, refracted by the first principal surface, and traveling toward the user,
in a composite optical system formed by the virtual image presentation plate and the projection optical system, the projection optical system is configured such that a second focal distance of the composite optical system on a second light path on which the second display light travels is shorter than a first focal distance of the composite optical system on a first light path on which the first display light travels, and
the display unit is positioned between a first focal point and a second focal point of the composite optical system.

10. The virtual image display device according to claim 9, wherein
the projection optical system includes a main concave mirror that reflects the image display light toward the virtual image presentation plate and an auxiliary concave mirror that reflects the image display light toward the main concave mirror, and
defining a plane along both a direction of incidence and a direction of output of the image display light on the virtual image presentation plate as a reference plane, the main concave mirror is provided in an orientation that causes the image display light to be incident on the main concave mirror in a direction along the reference plane, and the auxiliary concave mirror is provided in an orientation that causes the image display light to be incident on the auxiliary concave mirror in a direction intersecting the reference plane.

11. The virtual image display device according to claim 10, wherein
the auxiliary concave mirror is provided in an orientation that causes the image display light to be incident on the auxiliary concave mirror in a direction along a plane orthogonal to the reference plane.

12. The virtual image display device according to claim 9, wherein
the projection optical system includes a first reflection area shaped in a concave surface that reflects the first display light toward the virtual image presentation plate and a second reflection area shaped in a concave surface that reflects the second display light toward the virtual image presentation plate.

13. The virtual image display device according to claim 12, wherein
an angle of incidence and reflection of the second display light in the second reflection area is larger than an angle of incidence and reflection of the first display light in the first reflection area.

14. The virtual image display device according to claim 9, wherein
the virtual image presentation plate is a windshield provided in a vehicle and having a uniform thickness.

* * * * *